Sept. 9, 1952  S. G. JOHNSON  2,609,614
ALIGNED THREAD GAUGE
Filed April 13, 1946
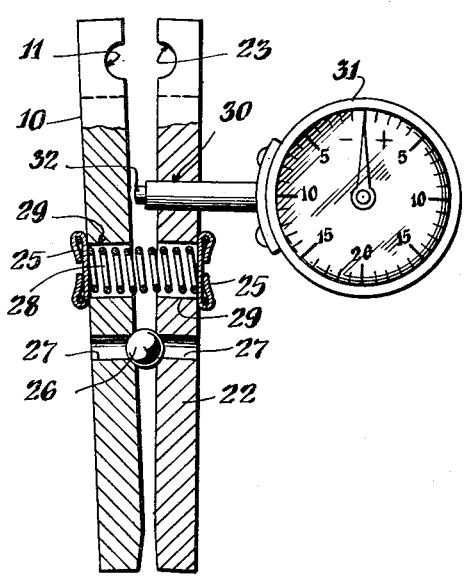
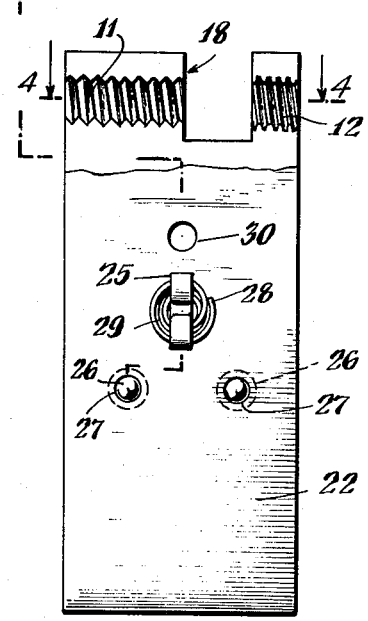
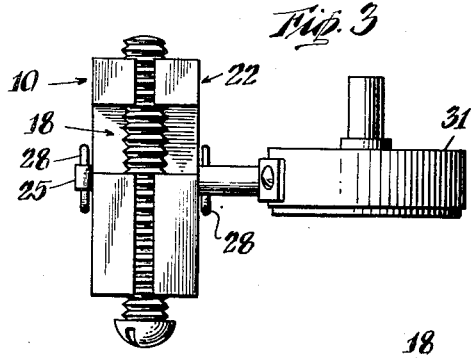
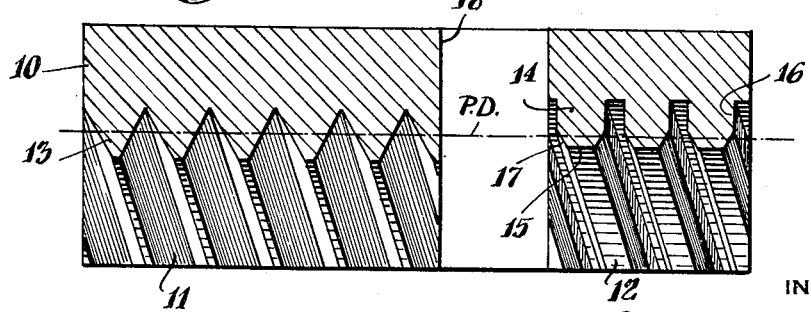
INVENTOR
STANLEY G. JOHNSON
BY
Bohleber, Fossett & Montstream
ATTORNEYS Patented Sept. 9, 1952

2,609,614

UNITED STATES PATENT OFFICE 2,609,614

ALIGNED THREAD GAUGE

Stanley G. Johnson, West Hartford, Conn., assignor to The Johnson Gage Company, Bloomfield, Conn., a corporation of Connecticut Application April 13, 1946, Serial No. 661,955

5 Claims. (Cl. 33—199)

The invention relates to a thread gage having pairs of gaging elements or portions, one pair of which has a relatively large number of thread gaging ribs for testing a screw thread for over all assemble-ability, and the second pair having not more than three gaging threads with reduced flank dimensions to gage the pitch diameter of a thread. The invention is shown as a scissors type of gage, although the invention contemplates a structure in which the gaging portions are moved towards and away from each other in any other fashion. The invention includes also a simple pivot structure for the scissors type of gage.

It is an object of the invention to construct a thread gage comprising a plurality of pairs of gaging portions which are fixed in alignment with each other so that they may be manufactured simultaneously, and so that the plurality of gaging portions of the gage may participate or be used as a single gage to test the thread of a test part for lead error.

It is an object to construct a scissors type gage with a simple, inexpensive and effective pivot mounting.

Other objects of the invention will be apparent from the following description taken in connection with the accompanying drawings illustrating a preferred form of the invention in which:

Figure 1 is a side view of a gage of the scissors type with a portion thereof in section taken on line 1—1 of Figure 2.

Figure 2 is a view of one of the gaging members showing the gaging threads in both the overall assemble-ability and the pitch diameter sections.

Figure 3 is an end view of the gage with a test screw in both gaging portions.

Figure 4 is an enlarged section through the gaging portions taken on line 4—4 of Figure 2.

The gage of the invention is designed to provide an effective and accurate gage and yet the manufacturing cost of which can be substantially reduced by virtue of the fact that two separate gages comprising an overall assemble-ability and a pitch diameter gage are manufactured largely as a single gage. Also both gaging portions may be used simultaneously to provide a longer thread contact and hence a more accurate check of lead error and taper.

The gage includes a gaging member 10 having a gaging portion 11 with helical thread gaging ridges of full thread form. The gaging portion 11 particularly illustrated is concave for gaging an external screw thread. The gaging portion 11 is of substantial length and therefore has a plurality of thread gaging ridges or turns therein. The gaging portion 11 forms part of an overall assemble-ability gage in that it cooperates with a like gaging portion to test a screw thread for general assemble-ability such as eccentricity, staggered threads, mutilated threads, lead error and the like. In alignment with the gage portion 11 and fixed or integral therewith is a second concave gaging portion 12 which has not more than three thread gaging ribs or thread turns therein. The gaging threads 13 for the gage portion 11 are full formed to engage the full or substantially full flank of a screw thread. The gaging thread 14 for the pitch diameter gage has its peak 15 reduced and the root 16 increased leaving a relatively short flank 17 at the pitch diameter so that this gaging portion constitutes a pitch diameter gage and tests a screw thread for pitch diameter. The thread ridges 13 and 14 are of the same pitch diameter, and preferably one thread is a continuation of the other. The two gaging portions preferably are formed from an integral part and a recess or channel 18 is provided between them so that the portion 12 may be used individually. The spacing between the two gaging portions may be greater or less as desired and the spacing may be sufficient so that a screw head may fit therebetween whereby the pitch diameter of a thread may be tested adjacent the head.

A similar gage member 22 is provided with an overall assemble-ability gaging portion 23 having a full thread for cooperation with gaging portion 11 and a pitch diameter gaging portion at the pitch line of the thread having a short flank corresponding to thread 14 for cooperation with the gaging portion 12. The two pairs of gaging portions are mounted for movement towards and from each other so that a threaded test part may be inserted or positioned in contact with the gaging portions.

Preferably the gage members 10 and 22 are mounted upon a pivot means of any suitable form, that illustrated including a pair of bearing balls 26 one of which engages a socket 27 in each gage member. A simple form of socket may be merely a hole in the gage member as illustrated. Spring means 28, shown as a tension spring extending through a hole 29 in each member, is located between the pivot means and the gaging portions and hence has the double function of pulling the gage members together and also retains the bearing balls therebetween. The gages are opened by pressing together the remote ends of the gage members. In the spring means shown, an initial tension is provided. A clip 25 at each end of the spring retains the latter within the holes and under tension.

One of the gage members is provided with a hole 30 which receives the end of a dial indicator 31 and the operating button 32 of which engages the other gaging member. Any suitable means may be utilized to indicate the position of the gaging members with respect to each other and thereby gage the thread of the test part as to its overall dimensions and general assemble-ability and as to its pitch diameter.

With the two gaging portions in alignment with each other, of the same pitch diameter, and with them fixed together or integral, the two threads 13 and 14 may be manufactured simultaneously in a single operation thereby making two gages with the manufacturing cost being not much greater than that of producing a single gage. The gaging ridges or threads 14 of the pitch diameter portion has the peaks removed and the roots increased to reduce the flank dimensions of the gaging ridges, so that the flank of the gaging ridges engages a test thread at a relatively small surface at the pitch diameter of the thread.

The gage has a second advantage by virtue of the fact that the two gaging portions are in alignment, of the same pitch diameter and the gaging threads or ridges in all gaging portions are a continuation of each other. When the plurality of gaging portions have a continuous gaging thread, the portion 11 and the portion 12 constitute a single gage for simultaneously gaging a screw thread which is long enough to extend through both gaging portions. A screw thread when so mounted within the gage enables the pitch diameter portion 12 to assist in gaging for lead error. In a test for lead error, it is immaterial that the flanks 17 of the thread ridges are shortened. Since the thread is engaged over a greater length it provides a more accurate determination of any lead error than could be afforded by the shorter gaging portions 11 alone. The gaging thread 14 of the portion 12 when used simultaneously as described will afford a test of such thread irregularities as may be engaged by the gaging ridges 14.

The invention is presented to fill a need for improvements in an aligned thread gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantage thereof.

What is claimed is:

1. A thread gage comprising a pair of gage members each having a long threaded gaging portion with a plurality of full formed gaging threads which portions cooperate to engage a threaded test part and form an overall assemble-ability gage, a second threaded gaging portion carried by each of the pair of gaging members having a maximum of three gaging threads to form short pitch diameter gaging portions, the overall assemble-ability and pitch diameter gaging portions being fixed with respect to each other and being in axial alignment, the gaging threads being of the same pitch diameter and a continuation of each other, the long and short gaging portions being axially spaced from each other whereby each gaging portion may be engaged individually by a test part, the flanks of the gaging threads of the short gaging portions being shorter radially than those of a full thread but including the pitch lines of the thread, means mounting at least one gage member for movement towards and away from the other to open and close the gaging portions, and means to indicate the relative position of the gage members.

2. A scissors type thread gage comprising a pair of gage members each having a long threaded gaging portion with a plurality of full formed gaging threads which portions cooperate to engage opposite sides of a threaded test part and forming an overall assemble-ability gage, a second threaded gaging portion carried by each of the pair of gaging members and having a maximum of three gaging threads to form short pitch-diameter gaging portions, the overall assemble-ability and pitch diameter gaging portions being fixed with respect to each other and in axial alignment and the gaging threads being of the same pitch diameter and a continuation of each other, the long and short gaging portions being axially spaced from each other whereby each gaging portion may be engaged individually by a test part, the flanks of the gaging threads of the short gaging portions being shorter than those of a full thread but including the pitch lines of the thread, means pivoting at least one gage member with respect to the other and the pivoting axis being parallel with the axis of the gaging portions to open and close the same, and means to indicate the position of the gaging members relatively to each other.

3. A thread gage comprising a pair of gage members each having a long threaded concave gaging portion with a plurality of full formed gaging threads which portions cooperate to engage opposite sides of a threaded test part and form an overall assemble-ability gage, a second threaded concave gaging portion carried by each of the pair of gaging members having a maximum of three gaging threads to form short pitch diameter gaging portions; the overall assemble-ability and pitch diameter gaging portions being fixed with respect to each other, located in axial alignment, being of the same pitch diameter and being a continuation of each other; the long and short gaging portions being axially spaced from each other whereby each gaging portion may be engaged individually by a test part, the flanks of the gaging threads of the short gaging portions being shorter than those of a full thread but including the pitch lines of the thread, means mounting at least one gage member for movement with respect to the other to open and close the gaging portions, and means to indicate the relative position of the gage members.

4. A scissors type thread gage comprising a pair of gage members each having a long threaded concave gaging portion with a plurality of full formed gaging threads which portions cooperate to engage opposite sides of a threaded test part and form an overall assemble-ability gage, a second threaded concave gaging portion carried by each of the pair of gaging members having a maximum of three gaging threads to form short pitch diameter gaging portions; the overall assemble-ability and pitch diameter gaging portions being fixed with respect to each other, located in axial alignment, the gaging threads being of the same pitch diameter and being a continuation of each other; the long and short gaging portions being axially spaced from each other whereby each gaging portion may be engaged individually by a test part, the flanks of the gaging threads of the short gaging portions being shorter than those of a full thread but including the pitch lines of the thread, means pivoting at least one gage member with respect to the other and the pivoting axis being parallel with the axis of the gaging portions to open and close the same, and means to indicate the relative position of the gage members.

5. A scissors type thread gage comprising a pair of gage members each having a long threaded gaging portion with a plurality of gaging threads which portions cooperate to engage opposite sides of a threaded test part forming an overall assemble-ability gage, a second threaded gaging portion fixed with each of the pair of gaging members having a maximum of three gaging threads forming a short pitch diameter gaging portion, the overall assemble-ability and pitch diameter gaging portions being in axial alignment and the gaging threads being of the same pitch diameter, the overall assemble-ability and pitch diameter gaging portions being axially spaced from each other whereby each gaging portion may be engaged individually by a test part, the flanks of the gaging threads for the short gaging portions being shortened by reducing the peak and by increasing the root thereof; means pivoting the gage members to open and close the gaging portions including a pair of bearing sockets in each gage member and the pivoting axis being parallel with the axis of the gaging portions, a ball in each socket, a spring under tension between the pivot balls and the gaging portions to retain the balls in the sockets and to draw the gaging portions together; and means to indicate the relative position of the gage members.

STANLEY G. JOHNSON.

REFERENCES CITED

The following references are of record in the file of this patent:

UNITED STATES PATENTS

| Number | Name | Date |
| --- | --- | --- |
| 1,294,004 | Weaver | Feb. 11, 1919 |
| 1,337,018 | Lockey et al. | Apr. 13, 1920 |
| 1,474,102 | Ashmore | Nov. 13, 1923 |
| 1,917,301 | Hartness | July 11, 1933 |
| 2,409,280 | Hohwart | Oct. 15, 1946 |
| 2,440,967 | Moore | May 4, 1948 |

FOREIGN PATENTS

| Number | Country | Date |
| --- | --- | --- |
| 3,461 | Great Britain | Feb. 10, 1913 |
| 15,036 | France | Feb. 1, 1912 |
| 102,573 | Great Britain | Dec. 14, 1916 |
| 124,001 | Great Britain | Mar. 20, 1919 |
| 234,350 | Germany | May 11, 1911 |
| 356,998 | Germany | Aug. 11, 1922 |
| 505,233 | France | July 26, 1920 |
| 559,900 | Germany | Sept. 26, 1932 |